United States Patent
Frazier et al.

(10) Patent No.: US 9,898,616 B2
(45) Date of Patent: Feb. 20, 2018

(54) PROVIDING LOGICAL PARTITIONS WITH HARDWARE-THREAD SPECIFIC INFORMATION REFLECTIVE OF EXCLUSIVE USE OF A PROCESSOR CORE

(71) Applicant: International Business Machines Corporation, Armonk, NY (US)

(72) Inventors: Giles R. Frazier, Austin, TX (US); Bruce Mealey, Austin, TX (US); Naresh Nayar, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

(21) Appl. No.: 14/721,052

(22) Filed: May 26, 2015

(65) Prior Publication Data

US 2015/0254473 A1    Sep. 10, 2015

Related U.S. Application Data

(63) Continuation of application No. 13/345,002, filed on Jan. 6, 2012, now Pat. No. 9,069,598.

(51) Int. Cl.
*G06F 21/62*   (2013.01)
*G06F 9/455*   (2018.01)
(Continued)

(52) U.S. Cl.
CPC ........ *G06F 21/6218* (2013.01); *G06F 9/3012* (2013.01); *G06F 9/45541* (2013.01);
(Continued)

(58) Field of Classification Search
CPC ...... G06F 21/6218; G06F 7/58; G06F 21/602; G06F 2009/45587; G06F 9/3851; G06F 9/45558; G06F 9/45541
(Continued)

(56) References Cited

U.S. PATENT DOCUMENTS 6,341,338 B1 *  1/2002  Dennie ................. G06F 9/5016
                                                                711/147
6,438,671 B1     8/2002  Doing et al.
(Continued)

OTHER PUBLICATIONS

"Power ISA Book III", Jan. 30, 2009, pp. 899-902, ver 2.06, US.
(Continued)

*Primary Examiner* — Abu Sholeman
(74) *Attorney, Agent, or Firm* — Mitch Harris, Atty at Law, LLC; Andrew M. Harris; Steven L. Bennett

(57) ABSTRACT

Techniques for simulating exclusive use of a processor core amongst multiple logical partitions (LPARs) include providing hardware thread-dependent status information in response to access requests by the LPARs that is reflective of exclusive use of the processor by the LPAR accessing the hardware thread-dependent information. The information returned in response to the access requests is transformed if the requestor is a program executing at a privilege level lower than the hypervisor privilege level, so that each logical partition views the processor as though it has exclusive use of the processor. The techniques may be implemented by a logical circuit block within the processor core that transforms the hardware thread-specific information to a logical representation of the hardware thread-specific information or the transformation may be performed by program instructions of an interrupt handler that traps access to the physical register containing the information.

20 Claims, 4 Drawing Sheets

(51) Int. Cl.
*G06F 9/30* (2018.01)
*G06F 9/38* (2018.01)

(52) U.S. Cl.
CPC ........ *G06F 9/45558* (2013.01); *G06F 9/3851* (2013.01); *G06F 2009/45587* (2013.01)

(58) Field of Classification Search
USPC .............................. 726/29; 712/219; 710/260
See application file for complete search history.

(56) References Cited

U.S. PATENT DOCUMENTS

| | | | | |
|---|---|---|---|---|
| 6,539,427 | B1* | 3/2003 | Natarajan | H04L 41/00 709/223 |
| 6,542,920 | B1 | 4/2003 | Belkin et al. | |
| 6,829,684 | B2 | 12/2004 | Doing et al. | |
| 6,993,640 | B2 | 1/2006 | Doing et al. | |
| 7,350,060 | B2 | 3/2008 | Floyd | |
| 7,370,156 | B1* | 5/2008 | Nguyen | G06F 9/5066 711/100 |
| 7,546,457 | B2 | 6/2009 | Sutton, II et al. | |
| 7,676,664 | B2* | 3/2010 | Kissell | G06F 9/30043 712/244 |
| 7,711,822 | B1* | 5/2010 | Duvur | G06F 9/5005 709/224 |
| 7,739,434 | B2 | 6/2010 | Farrell et al. | |
| 7,810,083 | B2 | 10/2010 | Chinya et al. | |
| 7,941,803 | B2 | 5/2011 | Armstrong et al. | |
| 8,032,890 | B2* | 10/2011 | Brendle | G06F 9/485 709/225 |
| 8,151,095 | B1* | 4/2012 | Wilt | G06F 9/3851 712/228 |
| 8,200,947 | B1* | 6/2012 | Nickolls | G06F 9/30087 712/220 |
| 8,804,523 | B2* | 8/2014 | Kim | H04L 47/11 370/235 |
| 8,949,838 | B2* | 2/2015 | Mital | G06F 9/3009 718/102 |
| 8,990,816 | B2* | 3/2015 | Frazier | G06F 9/45541 712/13 |
| 9,092,236 | B1* | 7/2015 | Jung | G06F 8/443 |
| 9,147,078 | B2* | 9/2015 | Muff | G06F 9/45533 |
| 9,183,399 | B2* | 11/2015 | Muff | G06F 9/45533 |
| 9,547,593 | B2* | 1/2017 | Tran | G06F 12/0811 |
| 9,760,411 | B2* | 9/2017 | Han | G06F 9/526 |
| 2002/0161828 | A1* | 10/2002 | Edison | G05B 19/052 709/203 |
| 2004/0068730 | A1 | 4/2004 | Miller et al. | |
| 2004/0153853 | A1* | 8/2004 | Moriki | G06F 9/5077 714/43 |
| 2004/0194096 | A1 | 9/2004 | Armstrong et al. | |
| 2004/0205272 | A1* | 10/2004 | Armstrong | G06F 9/4812 710/260 |
| 2004/0215939 | A1 | 10/2004 | Armstrong et al. | |
| 2004/0221271 | A1* | 11/2004 | Zeman | G06F 11/362 717/127 |
| 2004/0261032 | A1* | 12/2004 | Olander | G06F 3/0482 715/747 |
| 2005/0251670 | A1* | 11/2005 | Michaelis | G06F 9/44505 713/1 |
| 2006/0253682 | A1* | 11/2006 | Armstrong | G06F 12/109 711/173 |
| 2007/0094664 | A1* | 4/2007 | So | G06F 9/485 718/103 |
| 2007/0113218 | A1* | 5/2007 | Nolan | G06F 11/362 717/124 |
| 2007/0124568 | A1* | 5/2007 | Kra | G06F 9/462 712/226 |
| 2007/0204137 | A1* | 8/2007 | Tran | G06F 9/30181 712/214 |
| 2008/0168461 | A1 | 7/2008 | Arndt et al. | |
| 2008/0168552 | A1* | 7/2008 | Devendran | G06F 21/79 726/17 |
| 2008/0313437 | A1* | 12/2008 | Gschwind | G06F 9/30098 712/219 |
| 2009/0013153 | A1 | 1/2009 | Hilton | |
| 2009/0037906 | A1* | 2/2009 | Armstrong | G06F 12/1475 718/1 |
| 2009/0109207 | A1* | 4/2009 | Nakamura | G09G 3/2092 345/214 |
| 2009/0182979 | A1 | 7/2009 | Farrell et al. | |
| 2009/0282477 | A1* | 11/2009 | Chen | G06F 21/51 726/22 |
| 2010/0031325 | A1* | 2/2010 | Maigne | G06F 9/45533 726/4 |
| 2010/0069035 | A1* | 3/2010 | Johnson | H04W 4/02 455/404.1 |
| 2010/0125914 | A1* | 5/2010 | Dandekar | G06F 21/6281 726/26 |
| 2010/0287339 | A1* | 11/2010 | Olszewski | G06F 12/084 711/128 |
| 2011/0093638 | A1 | 4/2011 | Divirgilio et al. | |
| 2011/0208949 | A1 | 8/2011 | Bruce et al. | |
| 2011/0238969 | A1* | 9/2011 | Warkentin | G06F 9/441 713/2 |
| 2012/0042145 | A1* | 2/2012 | Sehr | G06F 12/1491 711/163 |
| 2012/0137118 | A1* | 5/2012 | Francois | G06F 9/44505 713/100 |
| 2012/0221793 | A1* | 8/2012 | Tran | G06F 12/0811 711/122 |
| 2012/0230341 | A1* | 9/2012 | Mital | G06F 9/3009 370/400 |
| 2012/0303911 | A1* | 11/2012 | Perrin | G06F 7/00 711/159 |
| 2012/0304026 | A1* | 11/2012 | Khanna | G06F 11/0715 714/57 |
| 2013/0007889 | A1* | 1/2013 | McCloy | G06F 8/61 726/26 |
| 2013/0091318 | A1* | 4/2013 | Bhattacharjee | G06F 12/1475 711/6 |
| 2013/0173539 | A1* | 7/2013 | Gilder | G06F 17/30578 707/622 |
| 2013/0179886 | A1* | 7/2013 | Frazier | G06F 9/45541 718/100 |
| 2013/0179892 | A1 | 7/2013 | Frazier et al. | |
| 2013/0263129 | A1* | 10/2013 | Adachi | G06F 9/45533 718/1 |
| 2013/0268700 | A1* | 10/2013 | Fuhs | G06F 13/28 710/22 |
| 2013/0337789 | A1* | 12/2013 | Johnson | H04W 4/02 455/414.1 |
| 2014/0006661 | A1* | 1/2014 | Chappell | G06F 13/42 710/105 |
| 2014/0047150 | A1* | 2/2014 | Marietta | G06F 13/14 710/264 |
| 2014/0149621 | A1* | 5/2014 | Han | G06F 17/30362 710/200 |
| 2014/0229690 | A1* | 8/2014 | Muff | G06F 9/45533 711/159 |
| 2014/0325184 | A1* | 10/2014 | Rotem | G06F 9/30083 712/42 |
| 2015/0278513 | A1* | 10/2015 | Krasin | G06F 9/5005 726/30 |

OTHER PUBLICATIONS

IBM Corp., "Power ISA™ Version 2.06 Revision B—Book III-E," Jul. 23, 2010, 1341 pages (pp. 1-1341 in pdf), US.

Popek, et al., "Formal Requirements for Virtualizable Third Generation Architectures," Communications of the ACM, Association for Computing Machinery, Inc., Jul. 1974, pp. 412-421, vol. 17, No. 7, U.S.

Govil, et al., "Cellular Disco: Resource Management Using Virtual Clusters on Shared-Memory Multiprocessors," Proceedings of the 17th ACM Symposium on Operating Systems Principles, Operating Systems Review, Dec. 12-15, 1999, pp. 154-169, vol. 34, No. 5, Kiawah Island Resort, New York, NY.

(56) References Cited

OTHER PUBLICATIONS

Szefer, et al., "Eliminating the Hypervisor Attack Surface for a More Secure Cloud," Computer and Communications Security, ACM, Oct. 17, 2011, pp. 401-412, New York, NY.
Office Action in U.S. Appl. No. 13/345,002, dated May 5, 2014, 26 pages (pp. 1-26 in pdf).
Final Office Action in U.S. Appl. No. 13/345,002, dated Nov. 4, 2014, 18 pages (pp. 1-18 in pdf).
Notice of Allowance in U.S. Appl. No. 13/345,002 dated Feb. 26, 2015, 10 pages (pp. 1-10 in pdf).
Office Action in U.S. Appl. No. 13/452,745, dated May 21, 2014, 26 pages (pp. 1-26 in pdf).
Notice of Allowance in U.S. Appl. No. 13/452,745 dated Nov. 10, 2014, 15 pages (pp. 1-15 in pdf).

\* cited by examiner

PROVIDING LOGICAL PARTITIONS WITH HARDWARE-THREAD SPECIFIC INFORMATION REFLECTIVE OF EXCLUSIVE USE OF A PROCESSOR CORE

The present Application is a Continuation of U.S. patent application Ser. No. 13/345,002, filed on Jan. 6, 2012 and claims priority thereto under 35 U.S.C. 120. The disclosure of the above-referenced parent U.S. Patent Application is incorporated herein by reference.

BACKGROUND OF THE INVENTION

1. Field of the Invention

The present invention is related to processing systems and processors, and more specifically to techniques for managing values of hardware thread specific information returned to logical partitions executed by hardware threads of a processor core.

2. Description of Related Art

In large scale computer systems, in particular in multi-user computer systems or so-called cloud computing systems in which multiple processors support multiple virtual operating systems and images, referred to as logical partitions (LPARs), a hypervisor manages allocation of resources to the LPARs, and the starting/stopping of LPARs at system startup/shutdown and context swaps. The LPARs are preferably isolated from each other when the system is used, for example, to support execution of different LPARs for different customers. Typically, the processor cores used in such a computer system support concurrent execution of multiple hardware threads, e.g., 8 or more hardware threads, which correspond to parallel execution pipelines within the processor core. Typically also, the hypervisor assigns a number of threads to each LPAR.

Status and other informational values within the processor are hardware thread-specific, i.e., the values may be either a value for each hardware thread number, be dependent on the thread trying to access the value, or may be the number of hardware threads that the processor supports.

It would be desirable to provide techniques for managing accesses to hardware thread-specific information that are independent of which LPAR is accessing the information and provides security between LPARS.

BRIEF SUMMARY OF THE INVENTION

The invention is embodied in a method, computer systems, processor core and computer program product that provide hardware thread-dependent status information in response to access requests. The information returned in response to the access requests is transformed if the requestor is a program executing at a privilege level lower than the hypervisor privilege level, so that each logical partition views the processor as though it has exclusive use of the processor core.

The method may be implemented by a logical circuit block within the processor that transforms the hardware thread-specific information to a logical representation of the hardware thread-specific information that reflects exclusive use of the processor core by threads of a given logical partition executed by the processor. Alternatively, the transformation may be performed by program instructions of an interrupt handler that traps access to the physical register of the processor core that contains the information. The interrupt handler either transforms the contents of the register directly, or performs the transformation via a look-up in memory of a table that contains previously transformed thread-specific information.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processor cores and processing systems in which hardware thread-dependent stored within processor cores is transformed when accessed by logical partitions (LPARs) that access the information. The transformation is performed such that it appears to each LPAR that the LPAR has exclusive use of the processor core. For example, if a processor core supports 8 hardware threads and the threads are apportioned equally between two LPARs being executed by the processor core, then requests for the number of hardware threads supported by the processor will be returned as 4 when the LPAR accesses that information. Similarly, arrays of hardware thread-specific information or words containing fields of thread-specific information will be modified to contain only 4 entries commencing at zero (or other base thread number used by the processor). Transformation of the hardware thread-specific information is triggered by an access from a privilege level lower than the hypervisor privilege level, so that when the hypervisor accesses the hardware thread-specific information, the hardware thread-specific information for all hardware threads is returned. The transformation of hardware-thread specific register values can be performed by a logical circuit, or by an interrupt handler that traps access to the register and returns the transformed value, which may be retrieved from a table in memory, or computed directly by the interrupt handler.

Figure 1:
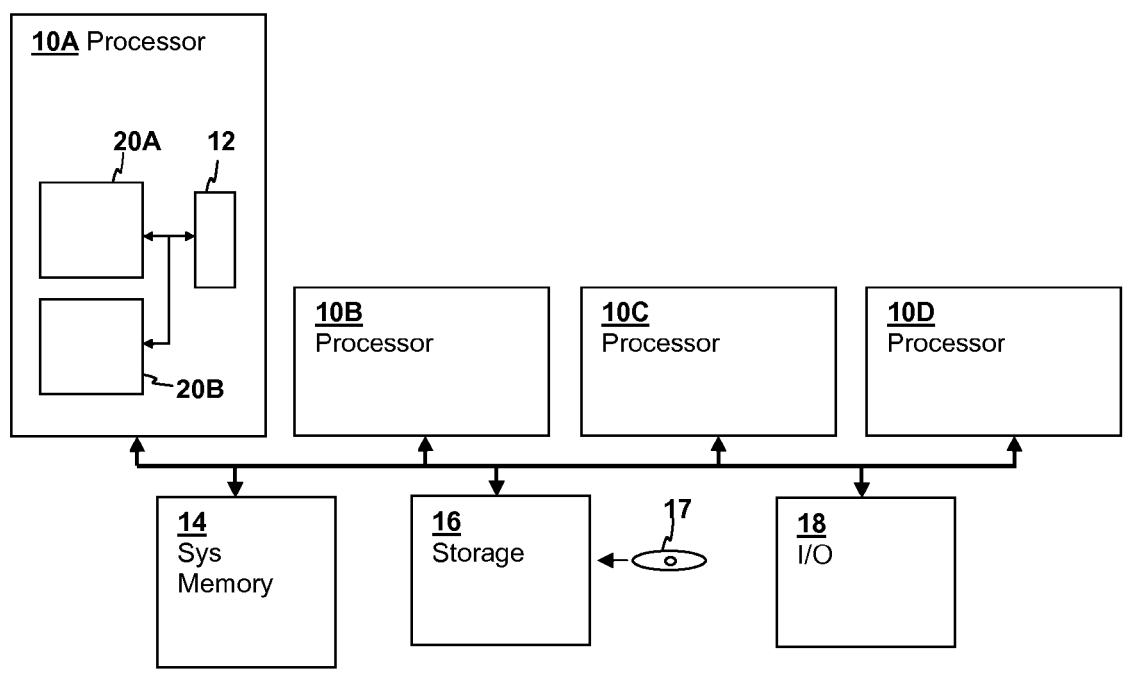
FIG. 1 is a block diagram illustrating a processing system in which techniques according to an embodiment of the present invention are practiced.

Referring now to FIG. 1, a processing system in accordance with an embodiment of the present invention is shown. The depicted processing system includes a number of processors 10A-10D, each in conformity with an embodiment of the present invention. The depicted multi-processing system is illustrative, and processing system in accordance with other embodiments of the present invention include uni-processor systems having symmetric multi-threading (SMT) cores. Processors 10A-10D are identical in structure and include cores 20A-20B and local storage 12, which may be a cache level, or a level of internal system memory. Processors 10A-10B are coupled to main system memory 14, a storage subsystem 16, which includes non-removable drives and optical drives, for reading media such as a CD-ROM 17 forming a computer program product and containing program instructions implementing a hypervisor for controlling multiple logical partitions (LPAR) for execution by processors 10A-10D, and also operating systems each of which has at least one supervisory thread for managing the operating system scheduler and other services, and also containing executable programs that implement applications and services executing within the logical partitions. The illustrated processing system also includes input/output (I/O) interfaces and devices 18 such as mice and keyboards for receiving user input and graphical displays for displaying information. While the system of FIG. 1 is used to provide an illustration of a system in which the processor architecture of the present invention is implemented, it is understood that the depicted architecture is not limiting and is intended to provide an example of a suitable computer system in which the techniques of the present invention are applied.

Figure 2:
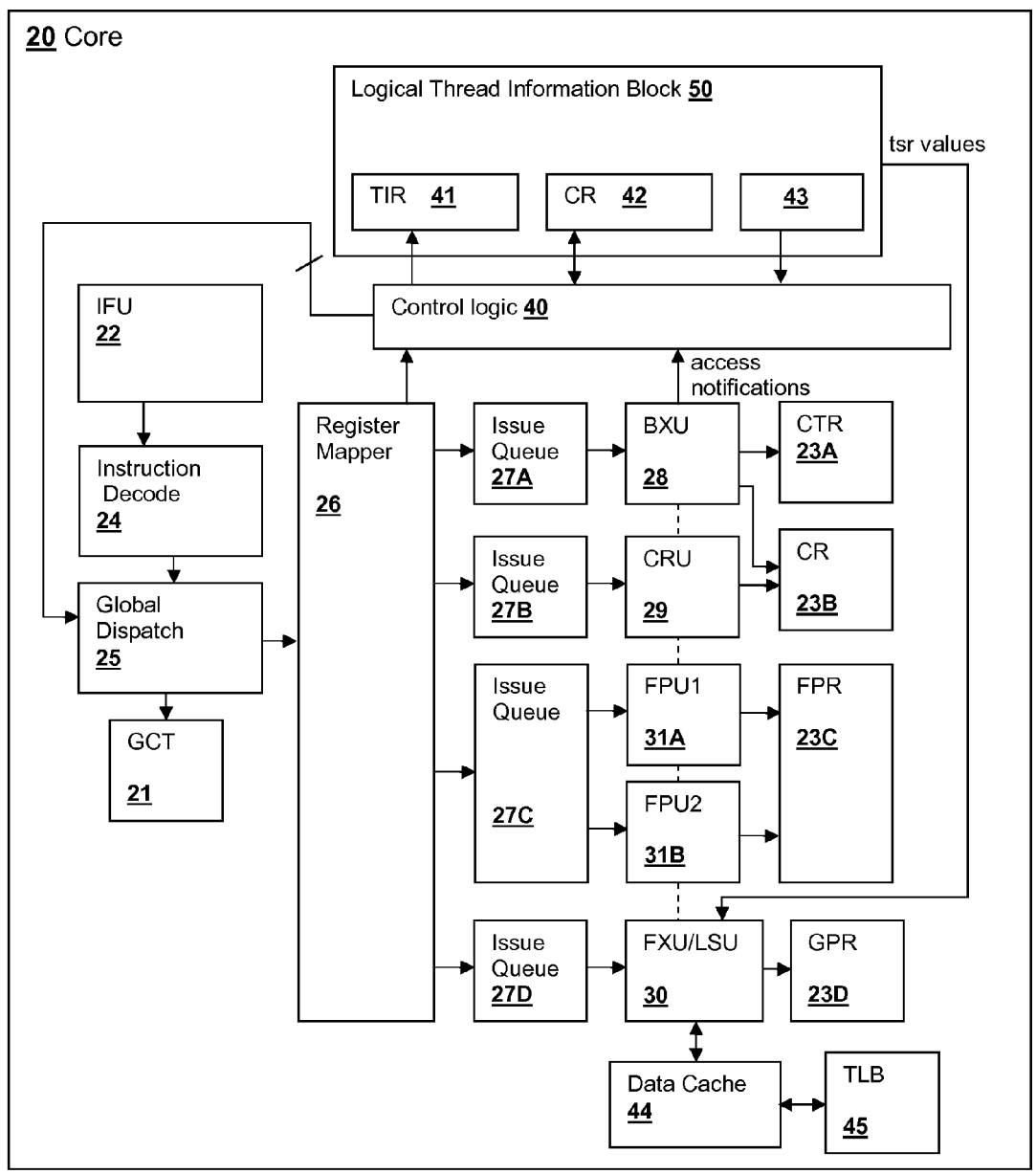
FIG. 2 is a block diagram illustrating details of a processor core 20 in accordance with an embodiment of the present invention.

Referring now to FIG. 2, details of processor cores 20A-20B of FIG. 1 are illustrated in depicted core 20. Core 20 includes an instruction fetch unit (IFU) 22 that fetches one or more instruction streams from cache or system memory and presents the instruction stream(s) to an instruction decode unit 24. A global dispatch unit 25 dispatches the decoded instructions to a number of internal processor pipelines. The processor pipelines each include a register mapper 26, one of issue queues 27A-27D, and an execution unit provided by branch execution unit (BXU) 28, condition result unit (CRU) 29, fixed-point unit load-store unit (FXU/LSU) 30 or floating point units (FPUs) 31A-31B. Registers such as counter register (CTR) 23A, condition register (CR) 23B general-purpose registers (GPR) 23D, and floating-point result registers (FPR) 23C provide locations for results of operations performed by the corresponding execution unit(s). A global completion table (GCT) 21 provides an indication of pending operations that is marked as completed when the results of an instruction are transferred to the corresponding one of result registers 23A-23D. Register mappers 26 allocate storage in the various register sets so that concurrent execution of program code can be supported by the various pipelines. FXU/LSU 30 is coupled to a data cache 44 that provides for loading and storing of data values in memory that are needed or modified by the pipelines in core 20. Data cache 44 is coupled to one or more translation look-aside buffers (TLB) 45 that map real or virtual addresses in data cache 44 to addresses in an external memory space.

Exemplary processor core 20 also includes a logical thread information block 50 that, in the illustrative example and for convenience of illustration, contains all of the hardware-thread specific registers within processor core 20. While the hardware-thread specific registers may generally be co-located with other registers or in any location, in the depicted embodiment of processor core, they are organized with other logic that controls access by FXU/LSU 30 to the hardware thread-dependent status information within core 20, by both the hypervisor and by the LPARs and applications executed within the LPARs. Exemplary hardware thread-dependent status information includes thread identification register (TIR) 41 and thread status register (CR) 42, along with an inter-thread message delivery status register 43. Table I below lists the exemplary hardware thread-specific status registers and their function and physical register contents/ranges. Table I, also shows the logical ranges/contents that will be returned to an LPAR that attempts to access the physical hardware thread-specific register, either by the control logic described below with reference to FIG. 3 or by the interrupt handling software described below with reference to FIG. 4.

TABLE I

| Register Name | Function/Meaning | Physical Value range | Logical Value Range | Logical Value Transform algorithm |
| --- | --- | --- | --- | --- |
| TIR (Thread Identification Register) | Contains the thread number of the accessing process | 0-N where N = number of threads minus 1 | 0-M, where M = number of threads allocated to the LPAR minus 1 | TIR - base[LPAR] |
| Thread Execution Status Register (CR) | Indicates whether a thread is active (executing) | Contains a bit for each of threads 0-N | Contains left-aligned bits for each of threads 0-M | shl(base[LPAR]) & mask |
| Inter-thread message delivery status registers | Indicates whether messages have been delivered to target thread | Contains a bit for each of threads 0-N | Contains left-aligned bits for each of threads 0-M | shl(base[LPAR]) & mask |

TIR 41 is a register that returns the value of the hardware thread number of the thread that is accessing TIR 41. In order to provide a logical equivalent to the LPAR that simulates exclusive use of processor core 20 by a hardware thread, the thread number must be normalized to range of hardware thread numbers that belong to the LPAR. For simplicity and the sake of illustration, it is assumed herein that the threads allocated for executing an LPAR are consecutively numbered and extend from a base hardware thread number: base[LPAR] to base[LPAR]+M, where M is one less than the number of threads allocated for the LPAR.

Transforming the value of TIR 41 merely requires subtracting base[LPAR] from the thread number in TIR 41. As an example, for a case in which LPAR #1 is allocated hardware threads 0-2 and thus has base[LPAR]=0, and LPAR #2 is allocated hardware threads 3-7, and thus has base[LPAR]=3, when physical thread 5 (of LPAR #2) accesses TIR 41, the logical value that should be returned by hardware or software implementing the present invention is 2 (i.e., physical thread 5 minus base[LPAR], which is 2). Thus the transformation of the physical thread-specific information to logical thread-specific information makes it appear to LPAR #2 that the range of TIR 41 values extends from 0 through 4, which would be the result of exclusive use of a processor core that supports five hardware threads. CR 42 is a register that contains the execution state (live/dead) of each hardware thread, with a bit for each hardware thread supported by processor core 20. Assuming that all bits are numbered from left to right starting at zero, when an LPAR accesses CR 42, the value returned contains a bit for each of the threads allocated for the LPAR, so the physical value of CR 42 is shifted left by base[LPAR] bit positions to obtain the logical value of CR 42 returned to the LPAR and is further masked with a mask value that contains a 1 bit for each hardware thread allocated to the LPAR. So, for the example given above, CR 42, when accessed by a thread of LPAR #2, which has a base[LPAR]=3, would be shifted left by three bit positions and masked. The logical value of CR 42 for LPAR #2 is a 5 bit field that contains bits 3 through 7 of CR 42 that is masked with mask 11111000 to remove information that may have been shifted in from the right. LPAR #1, which has base[LPAR]=0 receives a 3 bit field that contains only bits 0 through 2 of CR 42, which is the un-shifted value of CR 42 (since base[LPAR]=0) masked with mask=11100000 to remove bits corresponding to physical threads 3-7. Transforming the value of inter-thread message delivery status register 43 is the same as the transformation for control register CR 42 described above. Inter-thread message delivery status register 43 contains bits that indicate whether a message has been delivered to another thread. The register contains a bit for each of the other threads, so that messages to each other thread from the thread accessing the register can be tracked. In order to transform the value of inter-thread message delivery status register 43, the actual value of inter-thread message delivery status register 43 is shifted left by the number of bits specified by base[LPAR]. Thus, in the example given above, LPAR #2 receives a value for inter-thread message delivery status register 43 that is a 5-bit field containing the bits for threads 3-7, which is shifted left by 3 bits and masked with a value of 11111000 to remove information that may have been shifted in from the right. Similarly, LPAR #1 receives a value for inter-thread message delivery status register 43 that is a 3-bit field containing the bits for threads 0-2, which is not shifted and is masked with a value of 11100000 to remove information about physical threads 3-7. When sending messages between threads, the program instructions executed by the LPARs use logical thread numbers. If a logical thread number to which a message is sent is outside of the range of thread numbers allocated for executing the LPAR originating the message, an error is reported. Messaging to threads that are not allocated for executing the LPAR are thus blocked to prevent communication with a thread of another LPAR.

Figure 3:
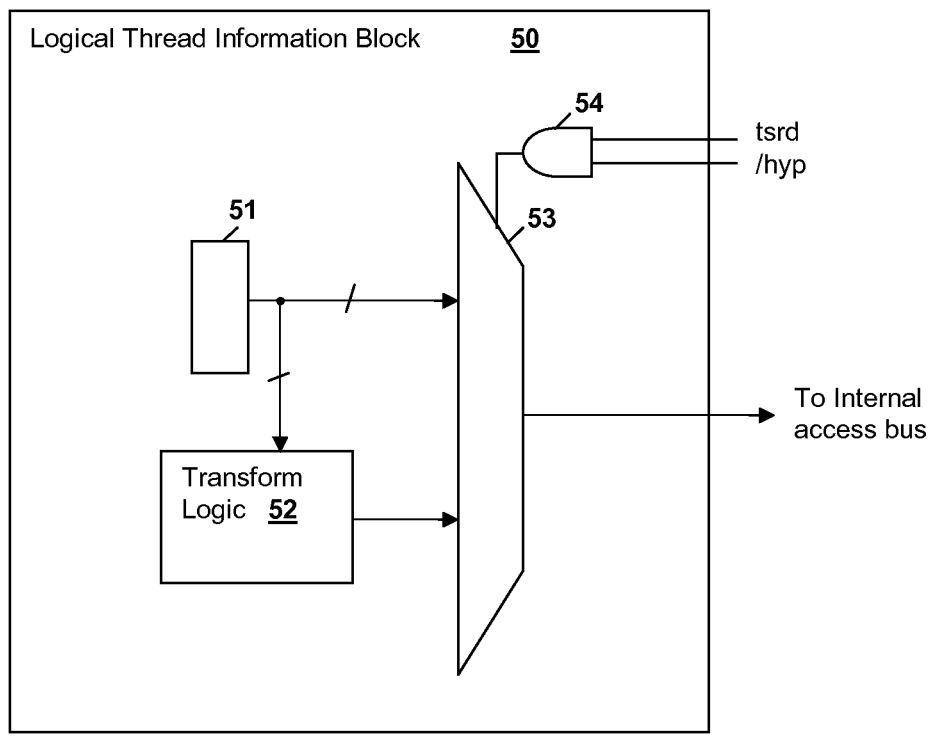
FIG. 3 is a block diagram illustrating details of logical thread information block 50 within processor core 20 of FIG. 2, in accordance with an embodiment of the present invention.

Referring now to FIG. 3, details of logical thread information block 50 of FIG. 2 are shown, in accordance with an embodiment of the present invention. While there are many different ways to implement logical thread information block 50, the circuit depicted in FIG. 3 provides one example. Within logical thread information block 50, hardware thread-dependent information status registers are represented by a register 51 and it is understood that the inputs outputs and circuits required to perform the transformations described above will be duplicated as needed for each such status register 51. A selector 53 selects the output of status register 51 except when status register 51 is being accessed by a non-hypervisor process (control signal/hyp=1). Logical-AND gate 54 provides the selection signal to selector 53, which, when status register 51 is accessed by a non-hypervisor process, selects the output of transform logic 52, which performs the transformations described above with reference to FIG. 2.

Figure 4:
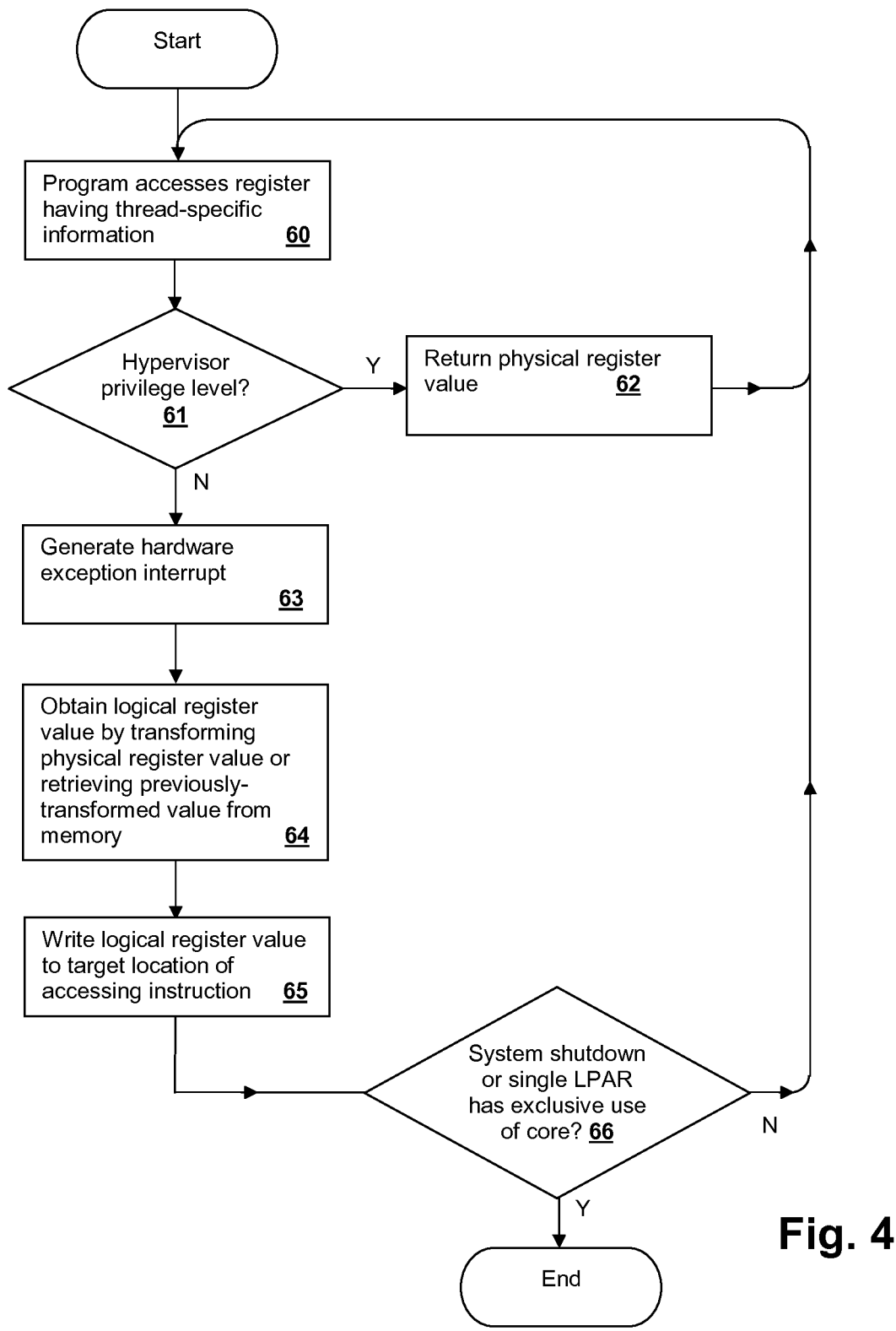
FIG. 4 is a flowchart depicting a method in accordance with another embodiment of the present invention.

Referring now to FIG. 4, a method of providing hardware thread-dependent status information to LPARs is illustrated in a flowchart, in accordance with an alternative embodiment of the present invention. The method illustrated in FIG. 4 does not require implementation of logical thread information block 50 in processor core 20, and provides an alternative mechanism for transforming the physical hardware thread-dependent register values to values that simulate exclusive use of processor core 20 by each of the LPARs. As illustrated in FIG. 4, when a program accesses a register containing hardware-thread specific information (step 60), if the accessing process is the hypervisor (decision 61), the physical register value is returned (step 62). However, if the accessing process is not the hypervisor (decision 61), i.e., the accessing process belongs to one of the LPARs, a hardware interrupt is triggered to trap the access (step 63). Processor core 20 has programmatic control of the return address to which the interrupt service handler will return and sets the return address to the address of the instruction following the instruction that attempted to access the hardware thread-dependent register. The logical register value is obtained by either programmatically performing operations similar to those performed by the logic described above with reference to FIG. 3, or, the transformation can be performed in advance and maintained every time one of the thread-dependent status information registers is updated in memory, so that the logical hardware thread-dependent register values can be retrieved (step 64) and then returned in response to the access (step 65), which is generally performed by writing the target register or memory location specified by the accessing instruction with the transformed hardware thread dependent information. Until the system is shutdown or optionally if an LPAR actually does have full and exclusive use of the processor core (decision 65), the process of steps 60-65 is repeated.

As noted above, portions of the present invention may be embodied in a computer program product, which may include firmware, an image in system memory or another memory/cache, or stored on a fixed or re-writable media such as an optical disc having computer-readable code stored thereon. Any combination of one or more computer readable medium(s) may store a program in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method of providing hardware thread-specific information in a multi-threaded processor supporting a number of hardware threads for executing processes within multiple logical partitions, the method comprising:
    maintaining the hardware thread specific information in an internal register circuit within the multi-threaded processor;
    a currently-executing one of the processes detecting access to the hardware thread-specific information;
    control logic within the processor determining whether or not a privilege level of the currently-executing process indicates that the currently-executing process is a process within a given one of the multiple logical partitions; and
    responsive to the control logic within the processor determining that the privilege level of the currently-executing process indicates that the currently-executing process is a process within a given one of the multiple logical partitions not having full access to the hardware thread-specific information, the control logic within the processor selectively transforming the hardware thread-specific information to generate a transformed register value that indicates exclusive use of the multi-threaded processor by hardware threads executed for processes of the given logical partition, while masking hardware-thread specific information present in the internal register circuit corresponding to one or more hardware threads of the multi-threaded processor that are assigned to execute processes of another logical partition other than the given logical partition, and responding to the access with the transformed register value.

2. The method of claim 1, wherein the determining further determines that the privilege level of the currently-executing process corresponds to a hypervisor that manages the multiple logical partitions, and wherein the method further comprises responsive to determining that the currently-execution process is a process of the hypervisor, formatting the hardware thread-specific information in a manner that shows all of the hardware thread-specific information in the internal register circuit for all of the number of hardware threads supported by the multi-threaded processor.

3. The method of claim 1, wherein the transforming is performed by a circuit comprising:
    a logic block that generates the a logical register value from the hardware thread-specific information in the internal register circuit to simulate the exclusive use of the multi-threaded processor by the given partition, wherein the logical register value differs from an actual value in the internal register circuit; and
    a data selector coupled to the logic block that selects an output of the logic block to provide the logical register value as the transformed register value to the currently-executing process in response to the access.

4. The method of claim 1, wherein the formatting is performed by:
    generating a trap interrupt when the access to the hardware thread-specific information is detected by the detecting;
    transforming, by the multi-threaded processor executing an interrupt service routine that services the trap interrupt, the hardware thread-specific information in the internal register circuit to simulate the exclusive use of the multi-threaded processor by the given partition to generate a logical register value that is different than an actual value in the internal register circuit; and
    replacing a return value for the access to the hardware thread-specific information with the logical register value.

5. The method of claim 1, wherein the hardware thread-specific information is the number of hardware threads supported by the multi-threaded processor, and wherein the transformed register value contains a quantity of the number of the hardware threads that are assigned to the given partition instead of the number of hardware threads supported by the multi-threaded processor.

6. The method of claim 1, wherein the hardware thread-specific information is a value dependent on a logical hardware thread number of a particular hardware thread assigned to the given partition and specified by the access, and wherein the transforming comprises:
    generating an actual hardware thread number from the logical hardware thread number;
    retrieving the hardware thread-specific information for the particular hardware thread using the actual hardware thread number; and
    including the retrieved hardware thread-specific information in the transformed register value.

7. A multi-threaded processor core, comprising:
    one or more execution units for executing instructions of multiple hardware threads;
    an instruction fetch unit for fetching the instructions of the multiple hardware threads;
    an instruction dispatch unit for dispatching the instructions of the multiple hardware threads to the execution units;
    a first register circuit containing hardware thread-specific information;
    a logic circuit for determining whether or not a privilege level of a process accessing the first register circuit indicates that the process has full access to thread-specific information contained in the first register circuit, and responsive to determining that process does not have full access to the thread-specific information, selectively transforming the hardware thread-specific information to a logical representation of the hardware thread-specific information to reflect exclusive use of the multi-threaded processor core by hardware threads executed for processes of a given logical partition executed by the multi-threaded processor core to generate a transformed register value, while masking hardware-thread specific information present in the first register circuit corresponding to one or more hardware threads of the multi-threaded processor core that are assigned to execute processes of another logical partition other than the given logical partition, and presenting the transformed register value in response to the access.

8. The multi-threaded processor core of claim 7, wherein an output of the logic circuit is presented in response to the access when the first register circuit is accessed at a privilege level lower than a hypervisor privilege level, and wherein a value of the first register circuit is presented directly in response to the access when the first register circuit is accessed at the hypervisor privilege level.

9. The multi-threaded processor core of claim 8, further comprising a data selector for selecting the output of the logic circuit when the first register circuit is accessed from the privilege level lower than the hypervisor privilege level and selecting the first register circuit when the first register circuit is accessed from the hypervisor privilege level.

10. The multi-threaded processor core of claim 7, wherein the hardware thread-specific information is the number of hardware threads supported by the multi-threaded processor core, and wherein the logical representation of the hardware thread-specific information is a number of hardware threads assigned to the given logical partition.

11. The multi-threaded processor core of claim 7, wherein the hardware thread-specific information is a value dependent on a logical hardware thread number of a particular hardware thread assigned to the given logical partition and specified when accessing the first register circuit, and wherein the logic circuit generates an actual hardware thread number from the logical hardware thread number, retrieves the hardware thread-specific information for the particular hardware thread using the actual hardware thread number, and includes the retrieved hardware thread-specific information in the transformed register value.

12. A computer system comprising:
a memory for storing program instructions and data values; and
a multi-threaded processor coupled to the memory for executing the program instructions, wherein the multi-threaded processor comprises one or more execution units for executing instructions of multiple hardware threads, an instruction fetch unit for fetching the instructions of the multiple hardware threads, an instruction dispatch unit for dispatching the instructions of the multiple hardware threads to the execution units, a first register circuit containing hardware thread-specific information, and a logic circuit for determining whether or not a privilege level of a process accessing the first register circuit indicates that the process has full access to the thread-specific information contained in the first register circuit, and responsive to determining that process does not have full access to the thread-specific information, selectively transforming the hardware thread-specific information to a logical representation of the hardware thread-specific information to reflect exclusive use of the multi-threaded processor by hardware threads executed for processes of a given logical partition executed by the multi-threaded processor to generate a transformed register value, while masking hardware-thread specific information present in the first register circuit corresponding to one or more hardware threads of the multi-threaded processor that are assigned to execute processes of another logical partition other than the given logical partition, and responding to the access with the transformed register value.

13. The computer system of claim 12, wherein an output of the logic circuit is selected when the first register circuit is accessed at a privilege level lower than a hypervisor privilege level.

14. The computer system of claim 13, wherein the multi-threaded processor further comprises a data selector for selecting the output of the logic circuit when the first register circuit is accessed from the privilege level lower than the hypervisor privilege level and selecting the first register circuit when the first register circuit is accessed from the hypervisor privilege level.

15. The computer system of claim 12, wherein the hardware thread-specific information is the number of hardware threads supported by the multi-threaded processor, and wherein the logical representation of the hardware thread-specific information is a number of hardware threads assigned to the given logical partition.

16. The computer system of claim 12, wherein the hardware thread-specific information is a value dependent on a logical hardware thread number of a particular hardware thread assigned to the given logical partition and specified when accessing the first register circuit, and wherein the logic circuit generates an actual hardware thread number from the logical hardware thread number, retrieves the hardware thread-specific information for the particular hardware thread using the actual hardware thread number, and includes the retrieved hardware thread-specific information in the transformed register value.

17. A computer program product comprising a computer-readable storage medium that is not signal or propagating wave storing program instructions for execution by a computer system, wherein the program instructions are program instructions of a hypervisor for managing multiple logical partitions executing within a processor core, wherein the program instructions comprise:
program instructions of an interrupt handler to, responsive to a trap interrupt generated upon access to an internal register circuit of a processor integrated circuit that contains hardware-thread specific information, transform the hardware thread-specific information in the internal register circuit to reflect an exclusive use of the processor core by a given logical partition by generating a logical register value that is different than an actual value in the internal register circuit; and
program instructions of the interrupt handler to replace a return value for the access to the internal register circuit containing hardware thread-specific information with the logical register value, wherein the hardware thread-specific information is a value dependent on a logical hardware thread number of a particular hardware thread assigned to the given logical partition and specified by the access to the internal register circuit, and wherein the program instructions of the interrupt handler that transform the hardware thread-specific information in the internal register circuit comprise program
instructions for generating an actual hardware thread number from the logical hardware thread number, and retrieving the hardware thread-specific information for the particular hardware thread using the actual hardware thread number, and wherein the program instructions that replace the return value replace the return value with the retrieved hardware thread-specific information.

18. The computer program product of claim 17, wherein the hardware thread-specific information is the number of hardware threads supported by the processor core, and wherein the program instructions of the interrupt handler that transform the hardware thread-specific information in the internal register circuit return a quantity of the number of the hardware threads that are assigned to the given logical partition as the logical register value.

19. A computer system comprising:
   a memory for storing program instructions and data values; and
   a processor coupled to the memory for executing the program instructions, wherein the program instructions are program instructions of a hypervisor for managing multiple logical partitions executing within the processor, wherein the program instructions comprise program instructions of an interrupt handler to, respo trap interrupt generated upon access to a internal register circuit of the processor that contains hardware-thread specific information by a process not having full access to the hardware-thread specific information, selectively transform the hardware thread-specific information in the internal register circuit to reflect an exclusive use of the processor core by a given logical partition by generating a logical register value that is different than an actual value in the internal register circuit, and program instructions of the interrupt handler to replace a return value for the access to the internal register circuit containing the hardware thread-specific information with the logical register value, wherein the hardware thread-specific information is a value dependent on a logical hardware thread number of a particular hardware thread assigned to the given logical partition and specified by the access to the internal register circuit, and wherein the program instructions of the interrupt handler that transform the hardware thread-specific information in the internal register circuit comprise program instructions for generating an actual hardware thread number from the logical hardware thread number, and retrieving the hardware thread-specific information for the particular hardware thread using the actual hardware thread number, and wherein the program instructions that replace the return value replace the return value with the retrieved hardware thread-specific information.

20. The computer system of claim 19, wherein the hardware thread-specific information is the number of hardware threads supported by the multi-threaded processor, and wherein the program instructions that transform return a quantity of the number of the hardware threads that are assigned to the given logical partition as the logical register value.

* * * * *